US007037543B2

(12) United States Patent
Sandusky et al.

(10) Patent No.: US 7,037,543 B2
(45) Date of Patent: May 2, 2006

(54) METHOD OF EXTENDING COLOR LIFE OF MODIFIED ATMOSPHERE PACKAGED FRESH RED MEAT USING *LABIATAE* PLANT EXTRACTS

(75) Inventors: Constance L. Sandusky, Richland, MI (US); Gregory S. Reynhout, Kalamazoo, MI (US); Thomas S. Jones, Kalamazoo, MI (US)

(73) Assignee: Kalsec, Incorporated, Kalamazoo, MI (US)

( * ) Notice: Subject to any disclaimer, the term of this patent is extended or adjusted under 35 U.S.C. 154(b) by 0 days.

(21) Appl. No.: 10/276,675

(22) PCT Filed: May 18, 2001

(86) PCT No.: PCT/US01/16244

§ 371 (c)(1),
(2), (4) Date: Oct. 6, 2003

(87) PCT Pub. No.: WO01/89308

PCT Pub. Date: Nov. 29, 2001

(65) Prior Publication Data
US 2004/0047957 A1 Mar. 11, 2004

Related U.S. Application Data
(60) Provisional application No. 60/205,776, filed on May 19, 2000.

(51) Int. Cl.
*B65B 31/02* (2006.01)
*B65D 81/20* (2006.01)
*A23B 4/20* (2006.01)
*A23L 3/3418* (2006.01)

(52) U.S. Cl. ............. 426/129; 426/264; 426/265; 426/316; 426/418
(58) Field of Classification Search ........... 426/264, 426/265, 129, 316, 418
See application file for complete search history.

(56) References Cited

U.S. PATENT DOCUMENTS

| 2,147,261 A | * | 2/1939 | Lewis |
| 2,788,278 A | * | 4/1957 | Zimont et al. |
| 2,902,369 A | * | 9/1959 | Komarik |
| 3,497,362 A | * | 2/1970 | Patron et al. |
| 3,814,821 A | * | 6/1974 | Oliver et al. |
| 3,911,146 A | * | 10/1975 | Hara et al. |
| 3,950,266 A | * | 4/1976 | Chang et al. |
| 4,012,531 A | * | 3/1977 | Viani |
| 4,343,823 A | * | 8/1982 | Todd et al. |
| 4,352,746 A | * | 10/1982 | Bracco et al. |
| 4,363,823 A | * | 12/1982 | Kimura et al. |
| 4,380,506 A |   | 4/1983 | Kimura et al. |
| 4,450,097 A | * | 5/1984 | Nakatani et al. |
| 4,683,139 A |   | 7/1987 | Cheng |
| 4,877,635 A | * | 10/1989 | Todd |
| 4,927,651 A | * | 5/1990 | Kumani |
| 5,017,397 A |   | 5/1991 | Nguyen et al. |
| 5,061,403 A |   | 10/1991 | Todd, Jr. |
| 5,209,870 A |   | 5/1993 | Todd, Jr. |
| 5,213,833 A | * | 5/1993 | Yamada et al. |
| 5,230,915 A |   | 7/1993 | Shahidi et al. |
| 5,338,838 A | * | 8/1994 | Hagiwara et al. |
| 5,415,883 A |   | 5/1995 | Leu |
| 5,498,432 A |   | 3/1996 | Leu |
| 5,540,942 A | * | 7/1996 | Tokoro |
| 5,955,126 A |   | 9/1999 | Jon et al. |
| 5,989,610 A |   | 11/1999 | Ruzek |
| 6,258,368 B1 | * | 7/2001 | Beerse et al. |

FOREIGN PATENT DOCUMENTS

DE 23 08 412 8/1974
JP 05 268870 10/1993

OTHER PUBLICATIONS

W. Manu-Tawiah, L.L. Ammann, J.G. Sebranek and R.A. Molins, 1991. "Extending the Color Stability and Shelf Life of Fresh Meat," Food Technology 45(3), 94-102.
C. Faustman, W.K.M. Chan, M.P. Lynch and S.T. Joo, 1996, "Strategies for Increasing Oxidative Stability of (Fresh) Meat Color", Reciprocal Meat Conference Proceedings, 49, 73-79.
S.D. Shivas, H.H. Kropf, M.C. Hunt, M.C. Kastner, L.L.A. Kendall and D.A. Dayton, 1984. "Effect of Ascorbic Acid on Display Life of Ground Beef", J. Food Protect. 47, 11-15, 19.
B.E. Greene, I.-M. Hsin and M.W. Zipser 1971, "Retardation of Oxidative Color Changes in Raw Ground Beef" J. Food Sci. 36, 940-942.
T. Okayama 1987, "Effect of Modified Gas Atmosphere Packaging After Dip Treatment on Myoglobin and Lipid Oxidation of Beef Steaks" Meat Sci. 19, 179-185.
Allen, P., Doherty, A.M., Buckley, D.J., Kerry, J., O'Grady, M.N., Monahan, F.J. 1996, "Effect of oxygen scavengers and vitamin E supplementation on colour stability of MAP beef" 42nd In. Cong. Meat Sci. Technol., 88-89.
Sante, V., Renerre, M., Lacourt, A., J. Food Qual. 17 177-195.
J.H. Hotchkiss et al, "Advances in and Aspects of Modified Atmosphere Packaging in Fresh Red Meats", Reciprocal Meat Conf. Proc. 42 (1989), pp. 31-40.
Souzan Saad Latif Abd. El-Allm et al, "Culinary herbs inhibit lipid oxidation in raw and cooked minced meat patties during storage" J Sci Food Agric (1999), vol. 79, pp. 277-285.

(Continued)

Primary Examiner—Steve Weinstein
(74) Attorney, Agent, or Firm—Flynn, Thiel, Boutell & Tanis, P.C.

(57) ABSTRACT

The color life of modified atmosphere packaged fresh red meat is extended by contacting the fresh red meat with an extract of a Labiatae herb prior to packaging the meat.

39 Claims, No Drawings

OTHER PUBLICATIONS

F. Timmermann, "Effectiveness of Natural Antioxidants in Salami-type Sausages", Oils-Fats-Lipids (1975), vol. 2, pp. 351-353.

Down, et al., "Comparison of Vitamin E, Natural Antioxidants and Antioxidant Combinations on the Lean Color and Retail Case-Life of Ground Beef Patties", Oklahoma State University, 1999, Animal Science Research Report, pp. 13-18.

Down, et al., "Influence of Vitamin E, Duralox®, and Herbalox® on Lean Color and Retail Case-Life of Ground Beef", Oklahoma State University, 1999, Animal Science Research Report, pp. 19-23.

* cited by examiner

METHOD OF EXTENDING COLOR LIFE OF MODIFIED ATMOSPHERE PACKAGED FRESH RED MEAT USING *LABIATAE* PLANT EXTRACTS

This application claims the benefit of Provisional U.S. Application No. 60/205,776, filed May 19, 2000.

FIELD OF THE INVENTION

This invention relates to a method for extending the color life of modified atmosphere packaged fresh red meat, and more particularly, to a method of extending the color life of modified atmosphere packaged fresh red meat using extracts of Labiatae plants.

BACKGROUND OF THE INVENTION

It has been a desire for major meat manufacturers to supply retail outlets from centralized processing facilities. In order to facilitate this desire, modified atmosphere packaged fresh meats have been developed. Modified atmosphere packaging, also known as MAP, of fresh meats involves the use of specific gas mixtures in the headspace of gas impermeable meat containers and enables the control of certain physical properties, such as appearance, of the fresh meats for an extended period of time.

Color shelf life of red meat is important to consumer acceptance. Consumers judge the freshness of red meat by the presence of bright red oxymyoglobin pigment. Oxymyoglobin in fresh red meat decreases with time during storage as it changes to the stable brown pigment, metmyoglobin. Although oxymyoglobin pigment fades during dark storage, for example in a meat locker, pigment loss is most pronounced in lighted, refrigerated display cases in retail establishments. Although pigment loss is primarily cosmetic in nature, it has serious economic consequences. Consumers in search of the freshest looking cuts avoid purchasing red meat containing even small amounts of brown metmyoglobin. The unsaleable product which results from oxymyoglobin loss in red meats costs the industry an estimated $700 million dollars annually.

Modified atmosphere packaging can be divided into two categories, high oxygen modified atmosphere packaging having an oxygen content above 40 vol. % and low oxygen modified atmosphere packaging having an oxygen content less than 20 vol. %. In low oxygen modified atmosphere packaging, oxygen is excluded from the package and the headspace atmosphere is usually made up of an inert gas such as nitrogen or a mixture of nitrogen and carbon dioxide. With low oxygen MAP, oxymyoglobin initially present on the surface of the meat is converted to deep purple, unnatural appearing, deoxymyoglobin pigment as the last remnants of oxygen are consumed by metabolic processes occurring in the meat tissue.

Deoxymyoglobin is a fairly stable pigment under completely anoxic conditions although it can convert to metmyoglobin during storage. When oxygen is re-introduced to the meat containing deoxymyoglobin, the meat re-blooms as deoxymyoglobin is converted back into oxymyoglobin. This phenomena has been used by meat companies with so-called "peel-pack" packaging in which the meat is packaged in a tray covered by two, separate plastic films, an outer oxygen barrier film and an inner oxygen permeable film. The meat is transported and stored under anoxic conditions and, prior to display in the retail meat case, the outer film is removed to allow the meat to re-bloom and re-form the bright red pigment, oxymyoglobin, consumers expect to see. The use of "peel-pack" technology has not been embraced commercially because of the handling necessary to remove the oxygen barrier film from each package and the need to insure adequate bloom time prior to display in the retail case. The meat industry is seeking a packaging technology that can be produced at the manufacturing point, distributed and displayed at retail facilities with a minimum of handling.

In high oxygen modified atmosphere packaging, high oxygen levels are maintained in the headspace atmosphere from the time of packaging through the time of consumption. Mixtures of oxygen and carbon dioxide are typically used, with a gas mixture of 80% oxygen and 20% carbon dioxide being most typical. The high oxygen helps extend the microbial shelf life of the product by inhibiting the growth of anaerobic microorganisms, many of which are pathogens.

With both types of MAP, gas mixtures are used with carbon dioxide playing a significant functional role and other gases, particularly nitrogen, functioning as optional inert diluents. Carbon dioxide is present in the gas mixtures because at sufficient levels, it is toxic to certain bacteria and thereby enhances the product's shelf life.

Modified atmosphere packaging has provided a method of extending the favorable appearance and properties of fresh meat but there still is a need for a method of further extending the packaged appearance of fresh meats.

W. Manu-Tawiah, L. L. Ammann, J. G. Sebranek and R. A. Molins, 1991. "Extending the Color Stability and Shelf Life of Fresh Meat," Food Technology 45(3), 94–102, teach that mixtures of tetrasodium pyrophosphate, sodium erythrobate and citric acid combined with modified atmosphere storage extended the color life of various meat types and cuts. The headspace atmosphere used in this work was 50% $CO_2$, 15% $O_2$ & 35% $N_2$. Pork chops, beef rib steaks, and ground beef samples were examined. Treatment suspensions were applied by marination of prime cuts and by direct addition to ground beef prior to the final grind. Samples were stored at 2° C. in cardboard boxes for 0, 7, 14, 21, or 28 days prior to opening. After master batch storage, individual trays were stored at 2° C. under fluorescent light for 0, 2, 4, 6, 8, or 10 days. Very little effect was seen on pork. Ground beef showed the most improvement with shelf life being extended by 1–3 days. In contrast, steaks gained one day of shelf life while no improvement was seen for chops. The greatest color differences occurred after 7 days dark storage and 3 days storage in the light. Erythrobate was shown to have significant effects on color in beef and to effect TBAs favorably. Sensory panelists were unable to distinguish between treated and untreated materials at any stage.

C. Faustman, W. K. M. Chan, M. P. Lynch and S. T. Joo, 1996, "Strategies for Increasing Oxidative Stability of (Fresh) Meat Color." Reciprocal Meat Conference Proceedings, 49, 73–79 teach that adding water soluble antioxidants such as ascorbic acid to meat preserves red meat color. Oxymyoglobin is more stable in meat with higher tocopherol concentrations. This work did not involve MAP technology. The authors also reviewed work showing that modified atmosphere packaging was an effective tool for extending color life. These authors showed that meat stored in MAP which contained sachets of iron (an oxygen scavenger) demonstrated significantly greater retail color shelf life than those which were not exposed to oxygen scavengers.

S. D. Shivas, H. H. Kropf, M. C. Hunt, M. C. Kastner, L. L. A. Kendall and D. A. Dayton, 1984. "Effect of Ascorbic Acid on Display Life of Ground Beef," J. Food Protect. 47, 11–15, 19, disclosed that ascorbic acid levels at 0.05 and 0.1% prolonged display life of 20 and 25% fat grade ground beef, with 25% fat content beef giving higher scores. Beef flavor improved with ascorbic acid treatment while TBA values decreased with ascorbic acid treatment. Display life was extended by 5 days. This work did not involve MAP technology.

B. E. Greene, I.-M. Hsin and M. W. Zipser 1971, "Retardation of Oxidative Color Changes in Raw Ground Beef." J. Food Sci. 36, 940–942, treated ground beef with ascorbic acid plus either BHA or propyl gallate. Treatment was shown to effectively retard oxidation for up to eight days of refrigerated storage. This work did not involve MAP technology.

Chin S. Cheng, U.S. Pat. No. 4,683,139, Jul. 28, 1987, teaches a process for preserving color in fresh pork using a phosphate, ascorbic acid or iso-ascorbic acid and a chelator (EDTA, citric or tartaric acid) in combination with modified atmosphere packaging. The treatment extended color shelf life up to 21 days. The atmosphere used in this work ranged from about 2% to about 30% oxygen.

T. Okayama 1987, "Effect of Modified Gas Atmosphere Packaging After Dip Treatment on Myoglobin and Lipid Oxidation of Beef Steaks." Meat Sci. 19, 179–185 dipped beef steaks in an ethanolic solution of ascorbic acid and tocopherol. The MAP (80% $O_2$, 20% $CO_2$) steaks with or without dip treatment maintained acceptable color after 13 days of storage. Dip treatment showed no significant improvement in color. TBA numbers of samples stored in air or under 80% $O_2$, 20% $CO_2$ atmosphere were lower for the dip treated samples than for the non-dip treated samples.

Allen, P., Doherty, A. M., Buckley, D. J., Kerry, J., O'Grady, M. N., Monahan, F. J. 1996, "Effect of oxygen scavengers and vitamin E supplementation on colour stability of MAP beef," $42^{nd}$ In. Cong. Meat Sci. Technol., 88–89, teaches that supplementation of the diet of steers with 2000 units of vitamin E (tocopherol) per day for forty days prior to slaughter had no effect on color stability of steaks stored with or without iron-containing oxygen scavengers in an atmosphere of 50% carbon dioxide; 50% nitrogen.

Sante, V., Renerre, M., Lacourt, A., J. Food Qual. 17 177–195, discusses the effect of modified atmosphere packaging on color stability and on microbiology of turkey breast meat. The best color results were obtained using a 100% carbon dioxide atmosphere combined with an oxygen scavenger. This treatment outperformed atmospheres containing high levels of oxygen.

J. H. Hotchkiss et al, "Advances in and Aspects of Modified Atmosphere Packaging in Fresh Red Meats", Reciprocal Meat Conf. Proc. 42 (1989), pages 31–40, states that although rosemary has been added to MAP poultry to preserve the color thereof, "Fortunately for the poultry people, poultry is not judged for myoglobin, so color is not a serious problem."

Yukichi Kimura et al, U.S. Pat. No. 4,380, 506, Apr. 19, 1983, discloses the addition of extracts of herbs such as sage, rosemary, marjoram, thyme, oregano and basil to food products such as ham, sausage and processed marine and livestock products for their antioxidant and anti-bacterial properties.

Uy Nguyen et al, U.S. Pat. No. 5,017,397, May 21, 1991, discloses plant extracts which are obtained by supercritical fluid extraction of ground leaves of the Labiatae family and added to food products such as processed meats and fish for their antioxidant properties. They do not discuss red meats.

Paul H. Todd, Jr., U.S. Pat. Nos. 5,061,403 and 5,209,870, Oct. 29, 1991 and May 11, 1993, both disclose a process for preparing an alkaline solution of Labiatae antioxidants and the use of these antioxidants in combination with polyphates in the pumping or brining of meats to inhibit "warmed-over" flavor and prevent off-color development.

Souzan Saad Latif Abd. El-Allm et al, Culinary herbs inhibit lipid oxidation in raw and cooked minced meat patties during storage", J Sci Food Agric (1999), Vol. 79, pages 277–285, disclose the mixing of spice extracts, such as sage, basil, thyme and ginger, with ground pork pretreated with an aqueous salt solution to prevent lipid oxidation.

F. Timmermann, "Effectiveness of Natural Antioxidants in Salami-type Sausages", Oils-Fats-Lipids (1975), Vol. 2, pages 351–353, discloses the use of natural antioxidants such as tocopherols or spice extracts in prolonging the shelf life of animal fats and cured raw sausages.

Although the prior art discussed above shows different methods of reducing oxidation effects in meats, particularly in the presence of oxygen scavengers and in inert atmospheres, this work is directed primarily at cured meats, or fresh red meat packaged under low (<30%) oxygen containing atmospheres. Only one author, Okayama, examined fresh red meat stored under a high oxygen atmosphere and his dip treatment was found to be ineffective in improving color. The prior art does not adequately address the problem of color retention in fresh red meats, and the need for a safe, permissible, and effective method of extending color life of prepackaged red meats remains. There still exists a need for a method of greatly extending the color life of modified atmosphere packaged fresh red meat, including meat that has not been subjected to a chemical processing or pretreatment step, through the use of a natural treating agent. While the prior art used oxygen scavengers such as ascorbates and erythrobates to prolong color shelf life, these are not permissible additives to red meats. The combination of these scavengers with conventional antioxidants, such as the synthetics BHA and BHT, and tocopherol, would be expected to slow down lipid oxidation. However, none of these conventional lipid antioxidants are permissible additives in red meats. Consequently, this invention provides the only presently known legal means of extending the color shelf life of MAP red meats.

SUMMARY OF THE INVENTION

A method of extending the color life of fresh red meat packaged in an elevated oxygen atmosphere comprising a step of contacting fresh red meat with an extract of a Labiatae herb prior to packaging the meat.

It is a further object of the present invention to provide red meat packaged in an atmosphere of greater than about 40% oxygen and containing an extract of a Labiatae herb.

These and other objects of the present invention are accomplished by contacting fresh red meat with an extract of a Labiatae plant prior to subjecting the meat to modified atmosphere packaging.

In one embodiment of the present invention, the Labiatae plant extract is applied to the fresh red meat by spraying.

In a preferred embodiment of the present invention, the fresh red meat is contacted with a rosemary extract prior to subjecting the meat to modified atmosphere packaging.

DETAILED DESCRIPTION

For the purposes of this invention, "fresh red meat" is red meat that has not been subjected to a curing process to alter the characteristics of the meat and includes meat from cattle, deer, goats, buffalo, elk and swine.

Labiatae plants contain a number of phenolic compounds that can function as food antioxidants. The compounds have different solubility characteristics depending on their structure and extracts can be prepared which contain predominantly lipophilic or hydrophilic phenolic components. One skilled in the art will be able to effect the proper combination to achieve the greatest possible effect at an acceptable dose. It should be recognized that many of the potentially active constituents are presently unknown. While rosemary is the preferred herb, sage, oregano, thyme and mints also are preferred members of the Labiatae genus.

Extracts can be prepared by using solvents in a manner conventionally used to prepare spice oleoresins extracts and infusions. Solvents can include those approved under 21 CFR part 173, such as water, ethanol, methanol, isopropyl alcohol, ethyl acetate, hexane, acetone, methyl ethyl ketone, methylene chloride, dichloroethane or mixtures thereof, or additionally, fluorohydrocarbons alone or in combination with food grade solvents. They can also be prepared by extraction with supercritical fluids such as supercritical carbon dioxide. Fluids which function as solubilizers or carriers can be added to the ground spice prior to the pressing operation. Suitable extraction methods are disclosed in U.S. Pat. Nos. 4,380,506, 5,017,397, 5,061,403 and 5,209,870, the disclosures of which are hereby incorporated by reference.

Lipophilic extracts can be prepared by extracting the dehydrated, ground spice in a food grade solvent such as hexane, acetone, or mixtures of hexane and acetone. Ethyl acetate or other food approved, relatively non-polar solvents, or mixtures of these solvents can also be used in this process. Active charcoal can be added to the ground spice prior to extraction or to the miscella after extraction to reduce chlorophyll levels in the resultant extract. After extraction, the solvents are removed by vacuum distillation and reduced to below FDA regulated levels. The resulting extracts are diluted with soybean oil to provide oil-dispersible or lipophilic final products with standardized performance in stabilizing test oils. For rosemary and other Labiatae, these extracts contain the lipid-soluble portion of the spice, and can include carnosic acid and carnosol and other as yet unidentified active components. Optionally, food grade emulsifying agents such as lecithin, hydroxylated lecithin, monoglycerides, diglycerides, polysorbates, diacetyl tartaric acid esters of monoglycerides, and the like, or mixtures thereof can be added as carriers or diluents.

Hydrophilic extracts can be prepared by a two stage extraction process. The dehydrated, ground spice is first extracted with a mixture of hexane and acetone. The solid residue from the extraction is then re-extracted using a mixture of acetone and water, methanol and water, ethanol and water or isopropyl alcohol and water. The resulting miscella is subjected to vacuum distillation to remove the solvent. It can optionally be purified by partitioning between water and an organic solvent. The final aqueous mixture may be diluted with food grade propylene glycol or glycerin to make a standardized, hydrophilic product. For rosemary, oregano, mint and other spices, these extracts contain hydrophilic components including rosmarinic acid. The use of aqueous alkaline solution are not contemplated for use in the methods and products of this invention.

Dispersible extracts containing both lipophilic and hydrophilic components can be prepared by extracting the dehydrated, ground spice (optionally containing active charcoal) with a mixture of methanol and water, ethanol and water, isopropyl alcohol and water or acetone and water. After solvent removal, the concentrated extract can be diluted with a vegetable oil or with propylene glycol to provide an oil-dispersible or water-dispersible extract, respectively. Optionally, food grade emulsifying agents such as lecithin, hydroxylated lecithin, monoglycerides, diglycerides, polysorbates, diacetyl tartaric acid esters of monoglycerides, and the like, or mixtures thereof can be added as carriers.

Labiatae herbs of two or more species can be combined and extracted to yield a product that can be used to enhance the color life of red meat stored in high oxygen atmospheres. Alternatively, extracts prepared separately from two or more Labiatae herbs can be combined and are a useful part of this invention.

The extracts used in the present invention can either be in the form of both lipophilic and hydrophilic preparations or mixtures thereof.

Ground rosemary can be extracted with a number of food grade solvents or mixtures thereof, such as hexane, acetone, methanol, ethanol, ethyl acetate, or with supercritical carbon dioxide. Depending upon the polarity of the solvent or solvent mixture different constituents can be extracted. Non-polar solvents favor the lipophilic components. Polar solvents favor the hydrophilic components. Some solvents extract both components and these can be partitioned in subsequent steps if desired.

After extraction, the solvents are removed by distillation to residual levels that meet FDA regulations. Active charcoal can be added at several points in the process to remove chlorophyll. The charcoal containing adsorbed chlorophyll is removed by filtration. Some volatile oils can be removed by distillation to control flavor. Vegetable oil can be added to the lipophilic extracts as a standardizing agent. Food grade emulsifiers can be added in place of vegetable oils to make water dispersible forms of the rosemary extract. Polar, hydrophilic food grade materials such as propylene glycol or glycerine or alcohol can be added to the hydrophilic extracts to standardize the flavor and activity. These extracts are well known in commerce under the common name of oleoresins.

Oleoresin rosemary containing the more lipophilic phenolic ingredients, such as carnosic acid and carnosol, which are specially prepared to have chlorophyll removed therefrom, can be applied directly by a spraying process onto the surface of the meat. The oleoresin can be diluted with a vegetable oil in order to facilitate the spraying thereof. The effective dosage or coating amount generally ranges from about 1 to 40 grams of oleoresin per 20 pounds of meat but can be varied as the situation dictates. A more preferred dosage amount is from 0.025 to 1 wt. % based on the total weight of the meat.

The water-dispersible forms of the rosemary extracts are rosemary oleoresins containing food-grade emulsifiers such as polysorbates, mono and diglycerides, lecithin, hydroxylated lecithin, sorbitan esters, tartaric acid esters of mono- and di-glycerides. These preparations are best used by combining them with up to 10 times, or more, of their weight of water, or brine, and applying the resulting suspension in amounts ranging from about 20 to 180 grams per 20 pounds of meat. The dilution rate of the water-dispersible rosemary extract can be adjusted depending on the process.

The hydrophilic rosemary extracts have been found to be particularly effective in stabilizing the meat color in modified atmosphere packaged red meats. A solution of rosmarinic acid and water or a mixture of water and a food grade alcoholic solvent, such as propylene glycol, has been found to be particularly convenient to apply. In one method of application, a propylene glycol/water solution containing approximately 3.2 weight percent rosmarinic acid is diluted by a factor of ten in water and sprayed onto the meat in an amount of about 10 to 120 grams of diluted solution per 20 pounds of meat prior to packaging.

It is desirable to have the lipophilic extract present in an amount of 100–5000 ppm, preferably 500–2000 ppm, based upon meat weight. The hydrophilic extract is preferably present in treated red meat in an amount of from 50–5000 ppm, preferably 500–4000 ppm. If carnosic acid is present in the extract, it should be contained in the treated red meat in an amount of from 5–300 ppm, preferably 10–50 ppm and if rosmarinic acid is present in the extract, it should be contained in the treated red meat in an amount of from 5–300 ppm, preferably 20–120 ppm. The range of dosages of the extracts which can be employed is very wide because the extracts themselves can be prepared in ways which provide greatly increased or decreased concentrations of the active components. Much smaller dosages of the highly concentrated extracts can provide functional amounts of the active components in the final meat product. It is noted, however, that using higher doses of extracts which are more dilute in active components often confers the advantage of providing a more uniform and therefore more effective dispersion of the dose in the final meat product. The concentrations and doses can be adjusted on a case by case basis by one skilled in the art to provide the optimum performance.

The present invention can be practiced by spraying techniques such as the utilization of pneumatic sprayers, electrostatic sprayers and atomizers to incorporate the extract onto the meat. Other techniques such as painting, dipping, marinating, vacuum tumbling injecting, mixing and pumping can also be used to incorporate the extract into the meat. The inventive mixtures can also be combined with and mixed into ground meat during the grinding process or at some point thereafter. The inventive mixtures can be combined with other additives such as polyphosphates, salt, water, flavors, broths, added proteins, sugar, starches and the like which are commonly incorporated into meats. Highly water-dispersible compositions formulated with emulsifying agents are particularly suited for this use.

It is important to distinguish fresh meats which may contain these ingredients and are covered by the present invention from cured meats, which may contain the same ingredients, but also contain one or more of the following: erythorbates, erythorbic acid, ascorbates, ascorbic acid, nitrites, nitrates or cultures. The present invention is limited to fresh meats, and does not include the stabilization of meat color in cured meats. The pigments in cured meat are chemically different from those in fresh red meat which makes them more stable. The inventive mixtures can be applied to a carrier such as maltodextrin, salt, texturized soy protein and the like. These solid dispersions can in turn be added to the meat by mixing or grinding. Combinations of these application techniques will sometimes be advantageous. It is also within the scope of the present invention to combine the Labiatae extracts with other naturally occurring antioxidants to stabilize the color of the modified atmosphere packaged meats. That is, it is contemplated that the Labiatae extracts can be combined with at least one of tocopherols, tocotrienols, green tea extracts and citric acid, should these become permissible additives. Additionally, mixtures of the hydrophilic and lipophilic Labiatae extracts can be used in the treatment of the meat prior to it being packaged. The specific ratios and dosages of the hydrophilic Labiatae extracts to the lipophilic extracts in the mixture can readily be determined by one skilled in the art to provide optimum performance depending on the meat and packaging conditions. It is also within the scope of the present invention to combine the Labiatae extracts with flavorings in the form of spice extracts such as black pepper, celery, white pepper, garlic and onion or synthetic flavorings such as reaction flavors and glutamates.

The advantages of the present invention are illustrated by the following examples. Up to three meat sources were blended to achieve the desired fat contents. Coarse ground, vacuum packaged ground chuck or round containing from 14–19% fat was obtained in 14 pound chubs from a local meat company. Lean meat from whole chuck pectoral muscle (approximately 10% fat) was obtained from the same source. Meat removed from beef trim from the same source contained 45% fat. These meat feedstocks were pre-ground through a 3/16 inch plate to reduce their particle size and aid in subsequent blending. The lean and fat portions were weighed into 12 pound batches in appropriate relative amounts to give the desired fat content and blended for two minutes in a Mainca RM-35 meat mixer/blender. Paddle direction was reversed every 15 seconds during the two minute blending time. Where a color-stabilizing treatment was added, one half of the required amount was added initially and the remainder added after 30 seconds of blending. Dry ice, crushed to a particle size of less than 1.7 mm, was added to maintain the meat temperature between 28 and 32 degrees Fahrenheit during blending. The meat was then ground through a 1/8 inch plate and separated into one pound samples. The ground meat was packaged into Cryovac BT92 trays using an Ilpra Basic 100 VG single mold modified atmosphere packaging machine using a barrier film. A heat seal temperature of 110° C. and heat seat time of 4 seconds was used. The packages were evacuated using a 700 mm Hg vacuum and back flushed with a +30 mm Hg stream of the appropriate gas mixture.

Headspace oxygen and carbon dioxide levels were measured with a PBI Dansensor Checkmate 9000 analyzer. C.I.E. 1976 L*a*b* values were obtained using a Minolta CR-300 Chroma meter using the "C" light source and multi measure reading (average of three successive readings). Three readings across the diagonal of the package were taken and averaged. The packaging film was cut away from the tray and flattened against the meat prior to the color measurements and the readings were taken through the film. The CIE Lab color measurement system defines a three dimensional color space in which values L*, a* and b* are plotted at right angles to each other. L* is a measure along an axis representing lightness or darkness. A measure along a red/green axis gives a* and a measure against a yellow/blue axis is represented by b*. CIE Lab is a popular color space for use in measuring reflective and transmissive objects. The a* value is widely used in the meat industry as a measure of redness. The time necessary for a sample to lose one third of its color has been arbitrarily chosen as a point at which to compare various treatments. A loss of more than one third of its color may be acceptable under some commercial conditions.

For the studies of combined dark and light storage, the meat was stored at a temperature of 32–35 degrees F. in the dark for ten days and then placed in a light box capable of providing uniform light of 200 foot candles (cool white fluorescent lamps) at a temperature of 35–40 deg. F. Under incandescent light, color loss is slower.

EXAMPLES

The following Examples demonstrate that the combination of high (>40%) oxygen modified atmosphere packaging combined with a rosemary or other Labiatae extract will extend color life to a commercially viable length of time. The dosages and relative amounts of hydrophilic and lipophilic constituents can be ascertained by techniques described herein by one skilled in the art. They will vary with the fat content, the freshness of the meat, the type of animal and even the strain, and with the feeding prior to slaughter.

Example 1

Ground beef containing 85% lean and 15% fat was prepared according to the method described above. The standardized lipophilic rosemary extract was added to the meat at a dose of 0.1% by weight based upon total meat weight and provided about 20 ppm carnosic acid to the final meat product. The standardized hydrophilic extract was added to the meat at a dose of 0.1% by weight based upon total meat weight and provided about 32 ppm rosmarinic acid to the final meat product. The meat was packed in oxygen-impermeable packaging under an atmosphere of 70 vol. % oxygen and 30 vol. % carbon dioxide. The meat was stored in the dark at a temperature of 32 degrees F. for 26 days. Samples were pulled at days 3, 5, 7, 10, 12, 14, 16, 18, 20, 22 and 26. The redness of the meat was measured calorimetrically using a* values. The percent a* retained was plotted vs. time in days. From these curves, the time at which each sample had faded to ⅔ of its original a* value (⅓ a* loss) was determined. A level of ⅔ of the starting color is commercially acceptable and is used as a cutoff point herein. In this test, ground beef containing no additive (control) was compared to ground beef containing a lipophilic rosemary extract and to a sample of ground beef containing a hydrophilic rosemary extract. Table 1 shows the days required for each sample to lose ⅓ of its a* value.

TABLE 1

| Additive | Days to 2/3 Original a* Value | Percentage Change |
| --- | --- | --- |
| Control | 6 | — |
| Lipophilic Rosemary Extract | 10 | 167% |
| Hydrophilic Rosemary Extract | 13 | 216% |

The samples containing lipophilic or hydrophilic extracts show dramatic increases in color stability as measured by retention of a* values.

Example 2

Ground beef containing 75% lean and 25% fat was prepared according to the method described above. The standardized hydrophilic extract was added to the meat at a dose of 0.1% by weight based upon total meat weight and provided about 32 ppm rosmarinic acid to the final meat product. Samples of the meat were packed in oxygen-impermeable packaging under various mixtures of oxygen and carbon dioxide. The meat was stored under cool white fluorescent lights at 200 foot candles at a temperature of 35–40 degrees F. Samples were pulled at daily intervals for six days and the redness of the meat was measured calorimetrically using a* values. The percent a* retained was plotted vs. time in days. From these curves, the time at which each sample had faded to ⅔ of its original a* value (⅓ a* loss) was determined. In this test, ground beef containing no additive (control) was compared to ground beef containing a hydrophilic rosemary extract. Table 2 shows the days required for each sample to lose ⅓ of its a* value.

TABLE 2

| Additive | Days to 2/3 Original a* Value | Percentage Change |
| --- | --- | --- |
| Control (80% $O_2$; 20% $CO_2$) | 3 | — |
| Hydrophilic Rosemary Extract (80% $O_2$; 20% $CO_2$) | 4.5 | 150% |
| Control (70% $O_2$; 30% $CO_2$) | 2.2 | — |
| Hydrophilic Rosemary Extract (70% $O_2$; 30% $CO_2$) | 4.5 | 205% |
| Control (40% $O_2$; 60% $CO_2$) | 2.4 | — |
| Hydrophilic Rosemary Extract (40% $O_2$; 60% $CO_2$) | 2.6 | 108% |

The improvement seen is more substantial for higher oxygen atmospheres than for meat packaged in a 40% oxygen, 60% carbon dioxide atmosphere. Meat loses color much more rapidly under fluorescent lighting than in the dark. The hydrophilic rosemary is effective in preventing light-induced color loss in ground beef.

Example 3

Ground beef containing 75% lean and 25% fat was prepared according to the method described above. The standardized lipophilic rosemary extract was added to the meat at a dose of 0.1% by weight based upon total meat weight and provided about 10 ppm carnosic acid to the final meat product. Samples of the meat were packed in oxygen-impermeable packaging under various mixtures of oxygen and carbon dioxide. The meat was stored under cool white fluorescent lights at 200 foot candles at a temperature of 35–40 degrees F. Samples were pulled at daily intervals for six days and the redness of the meat was measured calorimetrically using a* values. The percent a* retained was plotted vs. time in days. From these curves, the time at which each sample had faded to ⅔ of its original a* value (⅓ a* loss) was determined. In this test, ground beef containing no additive (control) was compared to ground beef containing a lipophilic rosemary extract. Table 3 shows the days required for each sample to lose ⅓ of its a* value.

TABLE 3

| Additive | Days to 2/3 Original a* Value | Percent Change (increase) |
| --- | --- | --- |
| Control (80% $O_2$; 20% $CO_2$) | 3 | — |
| Lipophilic Rosemary Extract (80% $O_2$; 20% $CO_2$) | 3.3 | 110% |
| Control (70% $O_2$; 30% $CO_2$) | 2.2 | — |
| Lipophilic Rosemary Extract (70% $O_2$; 30% $CO_2$) | 3.5 | 159% |

TABLE 3-continued

| Additive | Days to 2/3 Original a* Value | Percent Change (increase) |
|---|---|---|
| Control (40% O$_2$; 60% CO$_2$) | 2.4 | — |
| Lipophilic Rosemary Extract (40% O$_2$; 60% CO$_2$) | 2.8 | 117% |

Example 4

Ground beef containing varying fat to lean ratios were prepared according to the method described above. The standardized hydrophilic rosemary extract added at 0.1% by weight provided 32 ppm rosmarinic acid to the final meat product. The standardized hydrophilic rosemary extract added at 0.4% by weight provided 128 ppm rosmarinic acid to the final meat product. The standardized hydrophilic oregano extract added at 0.2% provided 64 ppm rosmarinic acid to the final meat product. Samples of the meat were packed in oxygen-impermeable packaging under an atmosphere of 70 vol. % oxygen and 30 vol. % carbon dioxide. The meat was stored for 10 days in the dark at 32 degrees F. and then placed under cool white fluorescent lights at 200 foot candles at a temperature of 35–40 degrees F. Samples were pulled after ten day's storage and at daily intervals thereafter for testing. The percent a* retained was plotted vs. time in days. In this test, ground beef containing no additive (control) was compared to ground beef containing hydrophilic rosemary extract. Table 4 shows percent a* values retained at various times.

TABLE 4

| Additive | % a* Retained Day 10 (% Increase over control) | % a* retained 10 days dark + 2 days light |
|---|---|---|
| Control (75% lean, 25% fat) | 42 | 33 |
| 0.1% Hydrophilic rosemary 75% lean, 25% fat | 74 (176%) | 64 (194%) |
| 0.4% Hydrophilic rosemary 75% lean, 25% fat | 79 (188%) | 68 (206%) |
| Control (82% lean, 18% fat) | 60 | 55 |
| 0.1% Hydrophilic rosemary 82% lean, 18% fat | 87 (145%) | 66 (120%) |
| Control (85% lean, 15% fat) | 58 | 38 |
| 0.1% Hydrophilic rosemary 85% lean, 15% fat | 71 (122%) | 57 (150%) |
| 0.2% Hydrophilic oregano 85% lean, 15% fat | 68 (117%) | 58 (153%) |

Meat producers are looking for acceptable color after 10 days storage in the dark followed by 2 days storage in the light. The border between acceptable and unacceptable color is dependent upon the observer, but is around an a* value of 17. This corresponds in these studies to about ⅓ loss of beginning a* value. Therefore, a retained a* value >67% after 10 days dark storage and 2 days in the light would be deemed of real commercial value. None of the control samples were able to achieve this level of color retention. It should be noted that the meat used in this example was perhaps 4–6 days old when purchased. Better performance is expected if the rosemary extracts are added to fresher meat after only a day or two old.

Example 5

Ground beef containing varying fat to lean ratios were prepared according to the method described above. The dispersible extract was formulated to contain hydroxylated lecithin and diacetyltartaric acid esters of monoglycerides as emulsifying agents. The dispersible extract added at 0.1% by weight provided about 10 ppm carnosic acid and about 5 ppm rosmarinic acid to the final meat product. The lipophilic rosemary extract added at 0.1% by weight provided about 10 ppm carnosic acid to the final meat product. Samples of the meat were packed in oxygen-impermeable packaging under an atmosphere of 70 vol. % oxygen and 30 vol. % carbon dioxide. The meat was stored for 10 days in the dark at 32 degrees F., and then placed under cool white fluorescent lights at 200 foot candles at a temperature of 35–40 degrees F. Samples were pulled after ten day's storage and at daily intervals thereafter for testing. The percent a* retained was plotted vs. time in days. In this test, ground beef containing no additive (control) was compared to ground beef containing a lipophilic rosemary extract. Table 5 shows percent a* values retained at various times.

TABLE 5

| Additive | % a* Retained Day 10 (% Increase over control) | % a* retained 10 days dark + 2 days light |
|---|---|---|
| Control (75% lean, 25% fat) | 42 | 33 |
| 0.1% Lipophilic rosemary 75% lean, 25% fat | 62 (148%) | 49 (148%) |
| 0.1% Dispersible rosemary 75% lean, 25% fat | 70 (167%) | 55 (167%) |
| Control (85% lean, 15% fat) | 58 | 38 |
| 0.1% Lipophilic rosemary 85% lean, 15% fat | 64 (110%) | 44 (116%) |

While the percent a* retained in this Example is less than the desired 67%, the example demonstrates that effectiveness can be improved by formulating the extract into a dispersible form, and that the dosage must be increased as the fat content of the meat decreases.

Example 6

Ground beef containing 82% lean and 18% fat was prepared according to the method described above. The standardized hydrophilic rosemary extract added at 0.1% by weight provided 32 ppm rosmarinic acid to the final meat product. Samples of the meat were packed in oxygen-impermeable packaging under atmospheres of 80 vol. % oxygen and 20 vol. % carbon dioxide; 70 vol. % oxygen and 30 vol. % carbon dioxide and air (21 vol. % oxygen, 0% carbon dioxide). The meat was stored for 10 days in the dark at 32 degrees F., and then placed under cool white fluorescent lights at 200 foot candles at a temperature of 35–40 degrees F. Samples were pulled after ten day's storage and at daily intervals thereafter for testing. The percent a* retained was plotted vs. time in days. In this test, ground beef containing no additive (control) was compared to ground beef containing a hydrophilic rosemary extract. Table 6 shows percent a* values retained at various times.

TABLE 6

| Additive | % a* Retained Day 10 (% Increase over control) | % a* retained 10 days dark + 2 days light |
|---|---|---|
| Control AIR | 55 | 29 |
| 0.1% Hydrophilic rosemary Air | 61 (111%) | 28 (97%) |
| Control (70% $O_2$; 30% $CO_2$) | 60 | 55 |
| 0.1% Hydrophilic rosemary 70% $O_2$; 30% $CO_2$ | 87 (145%) | 66 (120%) |
| Control (80% $O_2$; 20% $CO_2$) | 79 | 49 |
| 0.1% Hydrophilic rosemary 80% $O_2$; 20% $CO_2$ | 87 (110%) | 64 (131%) |

While both treatments provide acceptable color retention, this example shows that 70% oxygen is sometimes superior to 80%. The optimum oxygen content therefore must be ascertained on a case by case basis. It is noted that none of the packages containing an atmosphere of air had acceptable shelf life, demonstrating the significance of elevated oxygen content.

The treatment of the red meat according to the present invention prior to the modified atmospheric packaging unexpectedly greatly extends the color life of the red meat. The Labiatae extract is preferably added to the meat prior to grinding and is effective under high oxygen conditions. When the red meat is treated with hydrophilic rosemary extract and packaged in a modified atmosphere containing 70 vol. % oxygen and 30 vol. % carbon dioxide, the color life of the red meat has its greatest extension. Additionally, the present invention can be used to extend the color life of whole muscle cuts of meat as well as ground meat under similar processing and packaging conditions as ground meat.

The lipophilic extracts used in the above examples were standardized to give a dose of 10–20 ppm carnosic acid at a 0.1% dose of extract. The hydrophilic extracts used in the above examples were standardized to give a dose of 32–128 ppm rosmarinic acid at a 0.1–0.4% dose of extract. Dosages of carnosic acid in the finished meat product can vary between 5 and 300 ppm, depending on the storage and lighting conditions, and the desired shelf life. Under most conditions, optimum dosages will be in the range of 10 to 50 ppm. Dosages of rosmarinic acid in the finished meat product can vary between 5 and 300 ppm, depending on the storage and lighting conditions, and the desired shelf life. Under most conditions, optimum dosages will be in the range of 20 to 120 ppm. Combinations of lipophilic and hydrophilic constituents generally will reduce the dosage of the individual constituents or significantly increase color life. Up to about 300 ppm carnosic acid and up to about 300 ppm rosmarinic acid are feasible combinations. The optimum dose will depend upon the condition of the meat, the fat content, the desired MAP oxygen concentration, as well as the amount of other active constituents in the individual extracts. The relative amount of active constituents in the Labiatae genus varies from species to species. It can be determined by analytical procedures known to the art, such as high performance liquid chromatography (HPLC). In general, oxygen should be greater than 40% of the headspace, preferably greater than 60% and most preferably in the range of 70% to 80%, with carbon dioxide constituting the balance. A portion of the carbon dioxide can be replaced with an inert gas filler such as nitrogen or argon. Those practicing the art will be able to optimize dosages and mixtures of constituents and gases for specific meat applications. While the specification shows methods of extending the color shelf life by several days, an extension of only one day is commercially advantageous and may be achieved in art by regulating the dose.

It is to be understood that the invention is not to be limited to the exact details of operation, or to the exact compositions, methods, procedures or embodiments shown and described above, as obvious modifications and equivalents will be apparent to one of ordinary skill in the art, and the invention is only limited by the full scope legally accorded the appended claims.

What is claimed is:

1. A method of improving the color life of fresh red meat packaged in an high oxygen modified atmosphere comprising contacting fresh red meat with an extract of a Labiatae herb prior to packaging the meat wherein the extract is free of some of the volatile oils and has high antioxidant activity and little antimicrobial activity in fresh red meat and treating the extract contacted fresh red meat to high oxygen modified atmosphere packaging, said extract being present in an amount sufficient to extend the color life of said high oxygem modified atmosphere packaged fresh red meat.

2. A method of claim 1, wherein the Labiatae herb is selected from the group consisting of rosemary, sage, oregano, thyme, mint and mixtures thereof.

3. The method of claim 2, wherein the herb is rosemary.

4. The method of claim 2, wherein the herb is sage.

5. The method of claim 2, wherein the herb is oregano.

6. The method of claim 2, wherein the herb is a mint.

7. The method of claim 2, wherein the extract is hydrophilic.

8. The method of claim 11, wherein the extract contains rosmarinic acid.

9. The method of claim 11, wherein the treated meat contains between about 5 and about 300 ppm rosmarinic acid.

10. The method of claim 2, wherein the extract is lipophilic.

11. The method of claim 12, wherein the extract contains carnosic acid and optionally carnosol.

12. The method of claim 12, wherein the treated meat contains between about 5 and about 300 ppm carnosic acid.

13. A method of claim 10, wherein the herb extract is an oleoresin.

14. The method of claim 2, wherein the extract contains both hydrophilic and lipophilic constituents.

15. The method of claim 13, wherein the extract contains carnosic acid and rosmarinic acid.

16. The method of claim 14, wherein the treated meat contains between about 5 and 300 ppm carnosic acid and between about 5 and 300 ppm rosmarinic acid.

17. The method of claim 1, wherein the modified atmosphere is greater than about 40% oxygen and the remainder of the gas consists of carbon dioxide and optionally nitrogen.

18. The method of claim 7, wherein the modified atmosphere contains about 60% or more oxygen.

19. The method of claim 7, wherein the modified atmosphere contains between about 70% and 80% or more oxygen.

20. The method of claim 1, wherein the modified atmosphere consists of oxygen and carbon dioxide.

21. The method of claim 1, wherein the Labiatae extract is incorporated into the meat by spraying, injecting, dipping, painting, vacuum tumbling, marinating, mixing, pumping or by dispersion on a carrier.

22. A method of claim 1, wherein the herb extract is combined with a food grade emulsifier.

23. A method of claim 1 wherein the fresh red meat is ground fresh red meat.

24. A high oxygen modified atmosphere package comprising fresh red meat product packaged in an atmosphere of greater than about 40% oxygen and wherein said fresh red meat contains an extract of a Labiatae herb, wherein the extract is free of some of its volatile oils and has high antioxidant activity and little antimicrobial activity in fresh red meat and the extract is present in an amount sufficient to extend the color life of said high oxygen modified atmosphere packaged fresh red meat.

25. The product of claim 24, wherein the herb is rosemary.

26. The product of claim 24, wherein the herb is sage.

27. The product of claim 24, wherein the herb is oregano.

28. The product of claim 24, wherein the herb is mint.

29. The product of claim 24, wherein the extract is hydrophilic.

30. The product of claim 24, wherein the extract is lipophilic.

31. The product of claim 24, wherein the extract is a mixture of hydrophilic and lipophilic constituents of the parent herb or herbs.

32. The product of claim 24, wherein the oxygen content is above about 60%.

33. The product of claim 24, wherein the oxygen content is above about 70%.

34. The product of claim 24, wherein the oxygen content is about 80%.

35. The product of claim 24, wherein the atmosphere includes carbon dioxide and optionally nitrogen.

36. The product of claim 24, wherein the Labiatae extract is incorporated into the meat by spraying, injecting, dipping, painting, vacuum tumbling, marinating, mixing, pumping or by dispersion on a carrier.

37. The product of claim 24, wherein flavorings are added to the Labiatae herb extract.

38. A product of claim 24, wherein the Labiatae herb is selected from the group consisting of rosemary, sage, oregano, thyme, mint and mixtures thereof.

39. A product of claim 24 wherein the fresh red meat is ground fresh red meat.

* * * * *

US007037543C1

(12) EX PARTE REEXAMINATION CERTIFICATE (7999th)
United States Patent
Sandusky et al.

(10) Number: US 7,037,543 C1
(45) Certificate Issued: Jan. 18, 2011

(54) METHOD OF EXTENDING COLOR LIFE OF MODIFIED ATMOSPHERE PACKAGED FRESH RED MEAT USING LABIATAE PLANT EXTRACTS

(75) Inventors: Constance L. Sandusky, Richland, MI (US); Gregory S. Reynhout, Kalamazoo, MI (US); Thomas S. Jones, Kalamazoo, MI (US)

(73) Assignee: Kalsec, Incorporated, Kalamazoo, MI (US)

Reexamination Request:
No. 90/010,117, Mar. 7, 2008

Reexamination Certificate for:
Patent No.: 7,037,543
Issued: May 2, 2006
Appl. No.: 10/276,675
Filed: Oct. 6, 2003

(22) PCT Filed: May 18, 2001
(86) PCT No.: PCT/US01/16244
§ 371 (c)(1),
(2), (4) Date: Oct. 6, 2003
(87) PCT Pub. No.: WO01/89308
PCT Pub. Date: Nov. 29, 2001

Related U.S. Application Data
(60) Provisional application No. 60/205,776, filed on May 19, 2000.

(51) Int. Cl.
*A23B 4/20* (2006.01)
*A23L 3/3418* (2006.01)
*B65B 31/02* (2006.01)
*B65D 81/20* (2006.01)

(52) U.S. Cl. .................... 426/129; 426/264; 426/265; 426/316; 426/418
(58) Field of Classification Search .................. None
See application file for complete search history.

(56) References Cited

U.S. PATENT DOCUMENTS

| 4,380,506 | A | 4/1983 | Kimura |
| 4,683,139 | A | 7/1987 | Cheng |
| 5,017,397 | A | 5/1991 | Nguyen |
| 5,061,403 | A | 10/1991 | Todd |
| 7,550,162 | B2 | 6/2009 | Berdahl et al. |
| 2004/0131709 | A1 | 7/2004 | Berdahl et al. |
| 2006/0078657 | A1 | 4/2006 | Berdahl et al. |

FOREIGN PATENT DOCUMENTS

WO    WO 02/069741    9/2002

OTHER PUBLICATIONS

Loliger, "Natural Antioxidants", Rancidity in Foods, Elsevier Science Pub. Co., London, pp. 89–107 (1983).*
Kalsec "Herbalox® Seasoning R–10: The Natural Way to Protect Flavor and Color", pp.1–10 (Jun. 1991).*
Kalsec "Herbalock® Seasoning, Type D–20", Sep. 1993.*
Tymoschuk, et al., ISHS Acta Horticulturae 503: II WOC-MAP Congress Medicinal and Aromatic Plants, Part 4: Industrial Processing . . . , Published Apr. 1, 1999. (Abstract).
Okayama, "Effect of Modified Gas Atmosphere Packaging After Dip Treatment on Myoglobin and Lipid Oxidation of Beef Steaks" Meat Sci. 19: 179–185, 1987.
O'Grady, et al. "Colour–Stabilizing Efect of Muscle Vitamin E in Minced Beef Stored in High Oxygen Packs" Meat Science, 1998, 50:73–80.
Manu–Tawiah, et al. "Extending the Color Sability and Shelf Life of Fresh Meat" Food Technology, 1991, 45:94–102.
Faustman, et al. "Strategies for Incrasing Oxidative Satbility of (Fresh) Meat Color", Reciprocal Meat Conference Proceedings, 1996, 49:73–79.
Down, et al., Oklahoma State University Animal Science Research Report, 1999, pp. 13–18.
Buys, et al. Meat Science, 2000, 55:403–411. (abstract).
McCarthy, et al. Meat Science, 2001, 58:45–52. (abstract).
O'Grady, et al. Irish Journal of Agricultural and Food Research, 1997, 36:284 (abstract).
Sahoo, et al. Meat Science, 1997 47:223–230. (abstract).
Non–final Office Action dated Feb. 23, 2009 from U.S. Appl. No. 11/281,024.
Final Office Action dated Sep. 2, 2009 from U.S. Appl. No. 11/281,024.
Notice of Abandonment dated Mar. 10, 2010 from U.S. Appl. No. 11/281,024.
Burke, "The colour–stabilizing effects of rosemary oleoresin and mixed tocopherols on a fresh comminuted beef product", In Proceeding of the 27th Annual Food Science and Techology Research Conference, University College, Cork, 1997, p. 63.
Naturex, "Oxy'Less Clear: Effect on ground pork meat", Sep. 10, 1997.
Naturex, "Oxy'Less Clear", Sep. 15, 1997.
Lee, "Development and evaluation of a chicken breakfast sausage manufactured with mechanically deboned chicken meat" Poultry Science 1997, 76:415–421.
Floreno, "Oleoresin Demand Rises on New Uses, Expansions." Chemical Marketing Reporter, 1995, p. 23.
Topfer, "Natural Antioxidants gain with extraction techniques", Chemical Marketing Reporter, 1992, p. 5.
O'Grady, "Colour–Stabilising Effect of Muscle Vitamin E in Minced Beef Stored in High Oxygen Packs", Meat Science 1998, 50(I):73–80.
Naturex, "Oxy'Less Clear: Effect on Pork Chops", Sep. 10, 1997.
Stoick, "Oxidative Stability of Restructured Beef Steaks Processed with Oleoresin Rosemary, Tertiary Butylhydroquinone, and Sodium Tripolyphosphate," Journal of Food Science 1991 56(3):597–600.

(Continued)

*Primary Examiner*—Stephen J Stein

(57) ABSTRACT

The color life of modified atmosphere packaged fresh red meat is extended by contacting the fresh red meat with an extract of a Labiatae herb prior to packaging the meat.

OTHER PUBLICATIONS

Barbut, "Antioxidant Properties of Rosemary Oleoresin in Turkey Sausage", Journal of Food Science 1985, 50(5):1356–1359.

Kalsec, "Herbalox® Seasoning R–20: Meat and Poultry Applications Update", Oct. 1990.

Kalsec, "Herbalox® Seasoning, Type O", Sep. 1993.

Kalsec, "Herbalox® Seasoning, Type W", Sep. 1993.

Kalsec, "Herbalox® Seasoning, Type 25", Sep. 1993.

Herbalox® Seasoning, Type P, Sep. 1993.

Kalsec, "Herbalox® Seasoning, Type WM", Sep. 1993.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 24, 25 and 29-39 is confirmed.

Claims 1, 8, 9, 11 and 12 are determined to be patentable as amended.

Claims 2, 3, 7, 10 and 13-23, dependent on an amended claim, are determined to be patentable.

Claims 4-6 and 26-28 were not reexamined.

1. A method of improving the color life of fresh red meat packaged in an high oxygen modified atmosphere comprising contacting fresh red meat with an extract of a Labiatae herb prior to packaging the meat wherein the extract is free of some of the volatile oils and has high antioxidant activity and little antimicrobial activity in fresh red meat and treating the extract contacted fresh red meat to high oxygen modified atmosphere packaging, said extract being present in an amount sufficient to extend the color life of said high [oxygem] *oxygen* modified atmosphere packaged fresh red meat.

8. The method of claim [11] *7*, wherein the extract contains rosmarinic acid.

9. The method of claim [11] *7*, wherein the treated meat contains between about 5 and about 300 ppm rosmarinic acid.

11. The method of claim [12] *10*, wherein the extract contains carnosic acid and optionally carnosol.

12. The method of claim [12] *10*, wherein the treated meat contains between about 5 and about 300 ppm carnosic acid.

* * * * *

(12) EX PARTE REEXAMINATION CERTIFICATE (8725th)
United States Patent
Sandusky et al.

(10) Number: US 7,037,543 C2
(45) Certificate Issued: Nov. 29, 2011

(54) METHOD OF EXTENDING COLOR LIFE OF MODIFIED ATMOSPHERE PACKAGED FRESH RED MEAT USING LABIATAE PLANT EXTRACTS

(75) Inventors: Constance L. Sandusky, Richland, MI (US); Gregory S. Reynhout, Kalamazoo, MI (US); Thomas S. Jones, Kalamazoo, MI (US)

(73) Assignee: Kalsec, Incorporated, Kalamazoo, MI (US)

Reexamination Request:
No. 90/011,616, Apr. 1, 2011

Reexamination Certificate for:
Patent No.: 7,037,543
Issued: May 2, 2006
Appl. No.: 10/276,675
Filed: Oct. 6, 2003

Reexamination Certificate C1 7,037,543 issued Jan. 18, 2011

(22) PCT Filed: May 18, 2001
(86) PCT No.: PCT/US01/16244
§ 371 (c)(1),
(2), (4) Date: Oct. 6, 2003
(87) PCT Pub. No.: WO01/89308
PCT Pub. Date: Nov. 29, 2001

Related U.S. Application Data
(60) Provisional application No. 60/205,776, filed on May 19, 2000.

(51) Int. Cl.
*A23B 4/20* (2006.01)
*A23L 3/3418* (2006.01)
*B65B 31/02* (2006.01)
*B65D 81/20* (2006.01)

(52) U.S. Cl. .................. 426/129; 426/264; 426/265; 426/316; 426/418

(58) Field of Classification Search .................. None
See application file for complete search history.

(56) References Cited

To view the complete listing of prior art documents cited during the proceeding for Reexamination Control Number 90/011,616, please refer to the USPTO's public Patent Application Information Retrieval (PAIR) system under the Display References tab.

*Primary Examiner*—Stephen Stein

(57) ABSTRACT

The color life of modified atmosphere packaged fresh red meat is extended by contacting the fresh red meat with an extract of a Labiatae herb prior to packaging the meat.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-3, 7-25 and 29-39 is confirmed.

New claims 40 and 41 are added and determined to be patentable.

Claims 4-6 and 26-28 were not reexamined.

*40. A method of improving the color life of fresh beef packaged in an high oxygen modified atmosphere comprising contacting fresh beef with an extract of a Labiatae herb prior to packaging the beef wherein the extract is free of some of the volatile oils and has high antioxidant activity and little antimicrobial activity in fresh beef and treating the extract contacted fresh beef to high oxygen modified atmosphere packaging, said extract being present in an amount sufficient to extend the color life of said high oxygen modified atmosphere packaged fresh beef.*

*41. A high oxygen modified atmosphere package comprising fresh beef product packaged in an atmosphere of greater than about 40% oxygen and wherein said fresh beef contains an extract of a Labiatae herb, wherein the extract is free of some of its volatile oils and has high antioxidant activity and little antimicrobial activity in fresh beef and the extract is present in an amount sufficient to extend the color life of said high oxygen modified atmosphere packaged fresh beef.*

\* \* \* \* \*

(12) EX PARTE REEXAMINATION CERTIFICATE (10339th)
United States Patent
Sandusky et al.

(10) Number: US 7,037,543 C3
(45) Certificate Issued: Oct. 16, 2014

(54) **METHOD OF EXTENDING COLOR LIFE OF MODIFIED ATMOSPHERE PACKAGED FRESH RED MEAT USING *LABIATAE* PLANT EXTRACTS**

(75) Inventors: Constance L. Sandusky, Richland, MI (US); Gregory S. Reynhout, Kalamazoo, MI (US); Thomas S. Jones, Kalamazoo, MI (US)

(73) Assignee: Kalsec, Incorporated, Kalamazoo, MI (US)

Reexamination Request:
No. 90/011,964, Oct. 17, 2011

Reexamination Certificate for:
Patent No.: 7,037,543
Issued: May 2, 2006
Appl. No.: 10/276,675
Filed: Oct. 6, 2003

Reexamination Certificate C1 7,037,543 issued Jan. 18, 2011

Reexamination Certificate C2 7,037,543 issued Nov. 29, 2011

(21) Appl. No.: 90/011,964

(22) PCT Filed: May 18, 2001

(86) PCT No.: PCT/US01/16244
§ 371 (c)(1),
(2), (4) Date: Oct. 6, 2003

(87) PCT Pub. No.: WO01/89308
PCT Pub. Date: Nov. 29, 2001

Related U.S. Application Data

(60) Provisional application No. 60/205,776, filed on May 19, 2000.

(51) Int. Cl.
*B65B 31/02* (2006.01)
*B65D 81/20* (2006.01)
*A23B 4/20* (2006.01)
*A23L 3/3418* (2006.01)
*A23B 4/16* (2006.01)

(52) U.S. Cl.
CPC .............. *A23B 4/16* (2013.01); *A23V 2200/048* (2013.01)
USPC ........... 426/129; 426/264; 426/265; 426/316; 426/418

(58) Field of Classification Search
None
See application file for complete search history.

(56) References Cited

To view the complete listing of prior art documents cited during the proceeding for Reexamination Control Number 90/011,964, please refer to the USPTO's public Patent Application Information Retrieval (PAIR) system under the Display References tab.

*Primary Examiner* — Krisanne Jastrzab

(57) ABSTRACT

The color life of modified atmosphere packaged fresh red meat is extended by contacting the fresh red meat with an extract of a Labiatae herb prior to packaging the meat.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 24, 40 and 41 are determined to be patentable as amended.

Claims 2-23 and 25-39, dependent on an amended claim, are determined to be patentable.

1. A method of improving the color life of fresh red meat packaged in an high oxygen modified atmosphere comprising contacting fresh red meat with an extract of a Labiatae herb prior to packaging the meat wherein the extract is free of some of the volatile oils and has high antioxidant activity and little antimicrobial activity in fresh red meat and treating the extract contacted fresh red meat to high oxygen modified atmosphere packaging, said extract being present in an amount sufficient to extend *by at least one day* the color life of said high oxygen modified atmosphere packaged fresh red meat.

24. A high oxygen modified atmosphere package comprising fresh red meat product packaged in an atmosphere of greater than about 40% oxygen and wherein said fresh red meat contains an extract of a Labiatae herb, wherein the extract is free of some of its volatile oils and has high antioxidant activity and little antimicrobial activity in fresh red meat and the extract is present in an amount sufficient to extend *by at least one day* the color life of said high oxygen modified atmosphere packaged fresh red meat.

40. A method of improving the color life of fresh beef packaged in an high oxygen modified atmosphere comprising contacting fresh beef with an extract of a Labiatae herb prior to packaging the beef wherein the extract is free of some of the volatile oils and has high antioxidant activity and little antimicrobial activity in fresh beef and treating the extract contacted fresh beef to high oxygen modified atmosphere packaging, said extract being present in an amount sufficient to extend *by at least one day* the color life of said high oxygen modified atmosphere packaged fresh beef.

41. A high oxygen modified atmosphere package comprising fresh beef product packaged in an atmosphere of greater than about 40% oxygen and wherein said fresh beef contains an extract of a Labiatae herb, wherein the extract is free of some of its volatile oils and has high antioxidant activity and little antimicrobial activity in fresh beef and the extract is present in an amount sufficient to extend *by at least one day* the color life of said high oxygen modified atmosphere packaged fresh beef.

* * * * *